Aug. 11, 1959

F. KRALL 2,899,535

SEALING ELEMENTS, ESPECIALLY FLANGES, AND
PROCESS FOR THEIR PRODUCTION

Filed April 4, 1957

INVENTOR
FRIEDRICH KRALL,

BY *Bailey, Stephens & Huettig*

ATTORNEYS

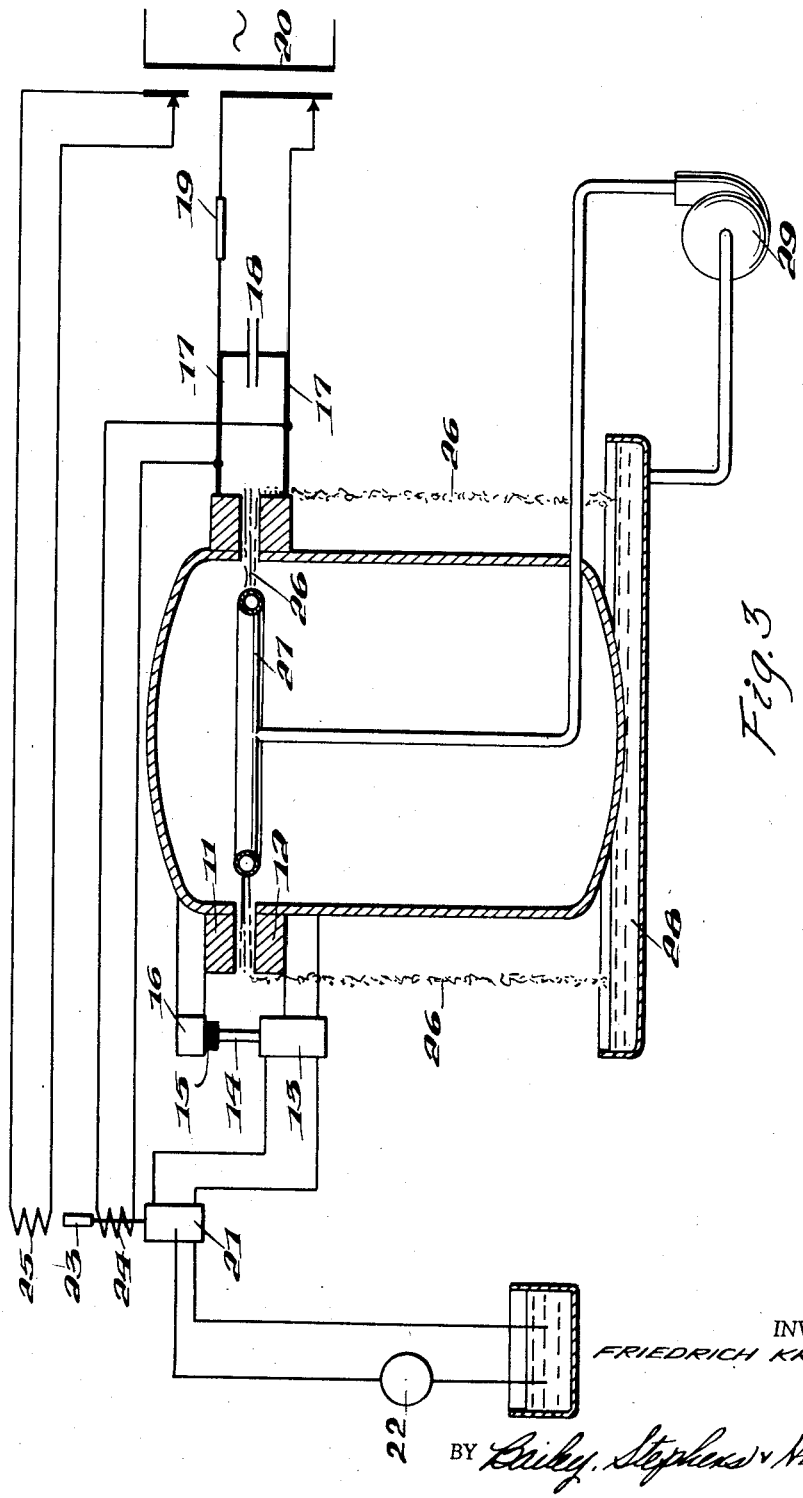

United States Patent Office 2,899,535
Patented Aug. 11, 1959

2,899,535

SEALING ELEMENTS, ESPECIALLY FLANGES, AND PROCESS FOR THEIR PRODUCTION

Friedrich Krall, Hanau (Main), Germany, assignor to Deutsche Gold- und Silber-Scheideanstalt vormals Roessler, Frankfurt, Germany Application April 4, 1957, Serial No. 650,675

Claims priority, application Germany April 4, 1956

4 Claims. (Cl. 219—69)

The present invention relates to novel sealing elements, especially flanges having mutually cooperating sealing faces, and a method for their production. The method according to the invention is especially adapted for the production of flange joints for high vacuum purposes and particularly such joints of large size on welded containers.

In the production of metallic sealing joints it was previously considered that a reliable seal against liquids and, above all, against gases could only be attained if the sealing surfaces were as smooth as possible and were carefully oriented with respect to each other. The fine preparation of such surfaces in many instances requires the use of high precision machines which under circumstances must be rather large. It is especially difficult to fulfill the necessary surface requirements for flanges of large dimensions which are to be used in vacuum vessels.

In the production of such large sealing flanges it has, for example, been proposed to provide both flange rings with a sheet metal sleeve and then machining the flanges on cutting apparatus or lathes. The sheet metal sleeve which had been provided on the flanges before the machining operation is then welded on to the vessel in order to join the flange to the vessel. Nevertheless, in many instances, especially when large dimensions are involved, welding strains occur which disturb the fitting surfaces of the flanges despite their previous careful preparation.

In some instances the unfinished flange is also joined to the vessel and preparation of the sealing surface is then effected in a subsequent operation with cutting machines. These machines are often not locally available. Furthermore, it often was necessary to send the entire apparatus back to its producer when latent welding strains caused a deformation of the flanges.

According to the invention it was found that two component sealing elements which even provide an excellent seal against high vacuum can be achieved while avoiding all or a part of the machining of the sealing surfaces by providing corresponding (complementary) elevations and depressions in the opposed sealing surfaces by surface evaporation of metal from such opposed surfaces. The invention is based upon the unexpected discovery that it is not necessary that each sealing surface be given a plane which is as close as possible to the theoretical flat plane. To the contrary, according to the invention it was found that it was only necessary that the positive and negative profiles of the opposed surfaces are so matched that a patrix and matrix are provided. The dimensions of the elevations and depressions which provide the profiles of the opposed sealing surfaces can far exceed the usual tolerances and can, with reference to the average plane, be much over 0.25 mm. and even over 0.5 mm. and can even be of the order of centimeters. The sealing surfaces of the sealing elements according to the invention furthermore can have the aspect of a wavy band and therefore such surfaces have randomly spherical contours in every direction. Also, it is not necessary as previously that the sealing surfaces be absolutely perpendicular to the mid-axis of the flange or sealing element.

A modification of the so-called electro-erosion process has been found particularly suitable for the production of the sealing elements according to the invention. The electro-erosion process has been used to produce profiled bore holes in metals and is carried out by producting electric arc discharges in rapid succession between the work piece and an electrode which locally evaporate the metal which is continuously removed with the aid of a flushing gas or liquid. In the process according to the invention the electric arc discharges are produced between the entire opposed surfaces of the sealing elements which are to serve as the sealing surfaces. The removal of the metal which has been vaporized by the electric discharges can be effected either with gaseous or liquid flushing agents. The sealing elements can expediently be subjected to the erosion process according to the invention in the crude state. However, in such crude parts which possess large irregularities they can be subjected to a limited pre-machining in order to save time but such pre-machining requires no particular accuracy.

The avoidance of the necessity of a finishing cutting machining operation for the exact fit of the flanges against each other provides special advantages in the production of larger vacuum flanges, for example, flanges of a diameter above 500 mm. Such flanges can be treated by the process according to the invention after they have been welded in place on the vacuum vessel, without the necessity of having large machines for precision cutting work at hand.

The accompanying drawings serve to illustrate the sealing elements produced according to the invention:

In such drawings:

Fig. 3 is a schematic view of an arrangement for the production of sealing flanges according to the invention by the electro-erosion process.

Figure 1:
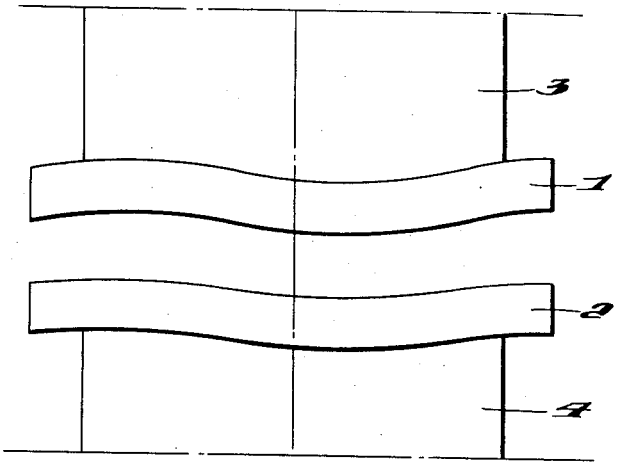
Fig. 1 is a schematic side view of a pair of sealing flanges before they have been subjected to the process according to the invention.
Figure 2:
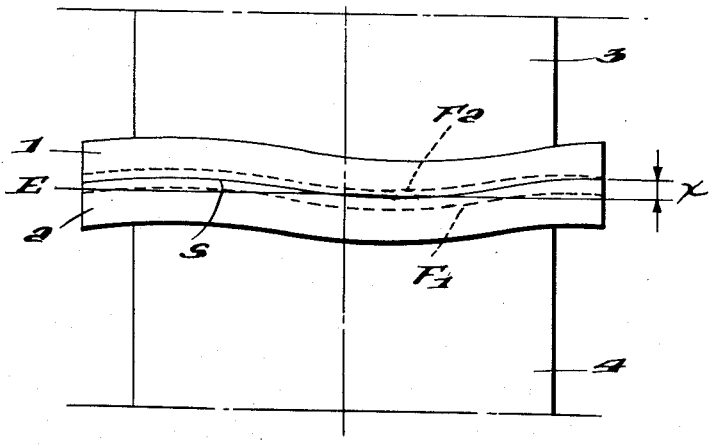
Fig. 2 is a schematic side view of such flanges after they have been subjected to the process according to the invention.

Fig. 1 shows a pair of flanges 1 and 2 provided with sheet metal sleeves 3 and 4. The opposed surfaces of such flanges are representative of the crude state of the flanges. When such flanges are brought into contact with each other only a three point contact would be achieved and the zones between such contacts would be spaced so as to prevent a good seal from being attained. When such a pair of flanges is subjected to an electro-erosion according to the invention so that the contacting points are eroded away and the electro-erosion is continued until the opposed surfaces of such flanges match each other, a separation line such as designated by S in Fig. 2 is obtained. Dotted line $F_2$ above separation line S and dotted line $F_1$ below separation line S respectively represent the original surface contours of flanges 2 and 1 before the surfaces thereof were eroded away by the process according to the invention.

The deviations of the contacting surfaces of the flanges from the theoretical plane E is designated by the distance X. The deviations X obtained in the production of flange rings by the process according to the invention from rings cut from crude sheet material has, in general, been found to be about 0.5 mm. However, when weld distortions occur, for example, because of welded on sheet metal sleeves 3 and 4, they can be considerably higher. However, such exaggerated deviations offer no hindrance to the production of a tight seal between the flange pair. In general, it is, however, desirable to stay within the indicated limits in order to shorten the procedure for the production of the sealing elements.

To define the above working process, Figure 3 shows the entire arrangement of the well known electro-erosion process in a scheme. The pair of flanges, numbered 1 and 2 in Figure 1 are numbered in Figure 3 11 and 12. Parts 11 and 12 are moved against each other by lifting appliance 13, 14, 15, 16. The operating piston 14 transfers the movement via insulator 15 to carrier 16 of the upper part of flange pair 11/12. The parallel movement of flange pair 11/12 requires that several, preferably three of such moving devices are mounted at the circumference of the flange. The scheme contains only one moving device.

In the electro-erosion process flange pair 11 and 12 are connected by strong wires 17 with condenser 18 which is charged by resistor 19 out of adjustable voltage transformer 20. The moving devices consisting of parts 13, 14, 15, and 16 are supplied by hydraulic control mechanism 21 from oil pressure pump 22. The adjusting device 21 is controlled by differential relay 23. Relay 23 is fitted with two windings 24 and 25. Winding 24 is connected with the operating voltage of condenser 18, and winding 25 is excited by a likewise adjustable voltage from transformer 20.

The gap between flanges 11 and 12 is flushed by liquid stream 26 which is conveyed to the gap through pipe 27. As soon as liquid stream 26 has passed the gap, it is again collected in basin 28 and reconveyed through pump 29 and pipe 27 to form stream 26.

The electro-erosion process is based on the following: Condenser 18 is discharged by the approaching of flange pair 11 and 12 in short consecutive intervals under sparking, the voltage being mostly 300. Each discharge spark at any point of the surfaces of flange pair 11/12 facing each other results in an evaporation of the flange material. To bring about the sparking the flange surfaces must almost touch each other. The evaporation products are flushed away by liquid stream 26 being mostly kerosene.

Moving mechanism 13, 14, 15, 16 is influenced by the power of coils 24 and 25. A falling of the voltage of coil 24 below that of coil 25 causes a lifting of the flange by means of control mechanism 13, 14, 15, 16. When thereby a gap of about .01 inch is formed the voltage of condenser 18 increases again. Thus the power of coil 24 becomes stronger and causes a lowering of the flange by means of moving mechanism 13. A proper adjustment of the operating voltage of transformer 20 and resistor 19 on the one hand and the comparison voltage of coil 25 on the other hand allows a trimming of the control mechanism so that a slow and steady approach between flange 11 and flange 12 takes place under continuous treatment of the flange material which leads at last to a tight sealing.

I claim:

1. In a process for the production of two component sealing elements, the components of which have mutually cooperating sealing faces providing a tight seal against high vacuum, the steps which comprise positioning the cooperating sealing faces of the components of the sealing elements in unfinished state opposite each other and evaporating material from the surfaces of the opposed faces by electric arc discharge erosion with removal of the evaporated material with a fluid flushing medium until such faces match with complementary elevations and depressions corresponding to each other.

2. The process of claim 1 in which the deviations of such elevations and depressions from the average plane of said faces is at least 0.25 mm.

3. The process of claim 1 in which the deviations of such elevations and depressions from the average plane of said faces is at least 0.5 mm.

4. A two component sealing flange, the components of which have matching mutually cooperating sealing faces providing a tight seal against high vacuum, said mutually cooperating sealing faces having complementary elevations and depressions corresponding to each other, the deviations of which from the average plane of such faces is at least 0.25 mm., produced by the process of claim 1.

References Cited in the file of this patent

UNITED STATES PATENTS

| 1,260,690 | Liady | Mar. 26, 1918 |
| 2,650,979 | Teubner | Sept. 1, 1953 |
| 2,761,050 | Ballhausen | Aug. 28, 1956 |
| 2,773,168 | Williams | Dec. 4, 1956 |
| 2,785,280 | Eisler et al. | Mar. 12, 1957 |

FOREIGN PATENTS

| 524,289 | Belgium | May 14, 1954 |
| 1,066,737 | France | Jan. 20, 1954 |

OTHER REFERENCES

"American Machinist," Spec. Rep. #356.